(12) United States Patent
Li (10) Patent No.: US 11,388,318 B1
(45) Date of Patent: Jul. 12, 2022

(54) MONITORING DEVICE (71) Applicant: Shen Zhen shouli intelligent technology co. LTD, Guangdong (CN)

(72) Inventor: Zheng Li, Guangdong (CN)

(73) Assignee: ShenZhen Shouli Intelligent Technology Co. LTD, Shenzhen (CN)

( * ) Notice: Subject to any disclaimer, the term of this patent is extended or adjusted under 35 U.S.C. 154(b) by 0 days.

(21) Appl. No.: 17/673,810

(22) Filed: Feb. 17, 2022

(30) Foreign Application Priority Data

Aug. 20, 2021 (CN) .......................... 202121980991.6

(51) Int. Cl.
| | |
|---|---|
| G03B 17/56 | (2021.01) |
| F16M 13/02 | (2006.01) |
| F16M 11/04 | (2006.01) |
| H04N 5/225 | (2006.01) |
| H04N 5/232 | (2006.01) |

(52) U.S. Cl.
CPC ......... *H04N 5/2252* (2013.01); *H04N 5/2256* (2013.01); *H04N 5/2257* (2013.01); *H04N 5/23241* (2013.01); *H04N 5/23251* (2013.01)

(58) Field of Classification Search
USPC .................. 359/589; 396/427; 348/143–151
See application file for complete search history.

(56) References Cited

U.S. PATENT DOCUMENTS

| | | | |
|---|---|---|---|
| 6,822,857 B2 | 11/2004 | Jung et al. | |
| 8,957,783 B2 * | 2/2015 | Aguilar | H04Q 9/00 348/222.1 |
| 2003/0063004 A1 * | 4/2003 | Anthony | G08B 13/19656 340/425.5 |
| 2006/0115265 A1 * | 6/2006 | Elberbaum | F16M 11/10 396/427 |
| 2008/0151052 A1 * | 6/2008 | Erel | H04N 5/33 362/418 |
| 2009/0027498 A1 * | 1/2009 | Owen | G08B 15/001 348/151 |
| 2009/0179988 A1 * | 7/2009 | Reibel | G08B 13/19 340/686.1 |
| 2010/0296805 A1 | 11/2010 | Mayer | |
| 2011/0199482 A1 | 8/2011 | Morgan | |

(Continued)

FOREIGN PATENT DOCUMENTS

JP 2016208258 A * 12/2016

*Primary Examiner* — Clayton E. LaBalle
*Assistant Examiner* — Warren K Fenwick (57) ABSTRACT

A monitoring device is provided in the disclosure, including a body, and a control circuit board, a camera component, a motion detection component and a power supply component. The control circuit board is electrically connected with the camera component, the motion detection component and the power supply component respectively, and the motion detection component is electrically connected with the power component. The control circuit board is awaken based on a detection result of the motion detection component, the control circuit board drives the camera component to make a camera shooting after being awaken, and power supplied by the power supply component to the awakened control circuit board and the camera component is a second power. A vertical angle of the camera component is adjusted by the manual adjustment mechanism, and a low power consumption mode can be realized by the motion detection component, thus saving resources.

18 Claims, 8 Drawing Sheets

(56) References Cited

U.S. PATENT DOCUMENTS

| | | |
|---|---|---|
| 2011/0234889 A1 | 9/2011 | Su |
| 2013/0201316 A1* | 8/2013 | Binder .................... H04L 67/12 |
| | | 701/2 |
| 2016/0100086 A1 | 4/2016 | Chien |
| 2016/0330825 A1* | 11/2016 | Recker ................... H05B 47/16 |
| 2020/0284883 A1* | 9/2020 | Ferreira ................ G01S 17/894 |
| 2021/0120151 A1 | 4/2021 | Rukes et al. |

* cited by examiner

Figure 8

MONITORING DEVICE

TECHNICAL FIELD

The disclosure relates to a technical field of monitoring, and in particular to a monitoring device.

BACKGROUND

As is known to all, a surveillance camera is a semiconductor imaging device with advantages of high sensitivity, strong light resistance, small distortion, small volume, long service life and vibration resistance. Currently, an existing outdoor monitoring cameras can generally be remotely controlled to realize camera rotation, which is convenient for users to monitor a certain position according to their needs. However, at present, a monitoring angle of the camera cannot be adjusted up and down in the existing monitoring camera, that is, it is with a narrow and limited adjustable monitoring range, and thus users' experience is easily affected and users' needs cannot be satisfied.

In addition, the existing surveillance camera, which is always on without any motion, monitors all day long and do not have a saving energy function.

Therefore, existing technologies need to be improved and developed.

SUMMARY

An object of the disclosure is to provide a monitoring device, which is used to solve problems that an angle of an existing camera cannot be adjusted up and down and the camera is turned on all day, resulting in resource waste.

Technical schemes of the disclosure are as follows: a monitoring device includes a body; and a control circuit board, a camera component, a motion detection component and a power supply component which are provided at the body.

The control circuit board is electrically connected with the camera component, the motion detection component and the power supply component respectively, and the motion detection component is electrically connected with the power component.

The control circuit board is awaken based on a detection result of the motion detection component, the control circuit board drives the camera component to make a camera shooting after being awaken; and power supplied by the power supply component to the awakened control circuit board and the camera component is a second power, and power supplied by the power supply component to the motion detection component before the control circuit board is awakened is a first power, and the second power is greater than the first power.

The body is provided with a manual adjusting mechanism for adjusting a vertical angle of the camera component; and the body is provided with a first motor for adjusting a horizontal angle of the camera component, which is electrically connected with the control circuit board.

Furthermore, the monitoring device further includes a lighting component provided at the body, and the lighting component is electrically connected with the control circuit board.

Furthermore, the lighting component is arranged inside the body, and the body is provided with a diffusion light transmissive plate at a position corresponding to the lighting component.

Furthermore, the monitoring device further includes a heat sink provided at the body, and the heat sink is arranged on a back of the lighting component.

Furthermore, the motion detection component includes an MCU controller and a motion detection sensor which are arranged at the body, and the MCU controller is electrically connected with the motion detection sensor, the control circuit board and the power supply component respectively.

Furthermore, the body includes a shell and a base, and the camera component is arranged in the shell.

The first motor is arranged on the base, and a rotating shaft of the first motor is connected with the shell and used for driving the shell to rotate horizontally; alternatively, the first motor is arranged on the shell, and the rotating shaft of the first motor is connected with the base for driving the shell to rotate horizontally.

Furthermore, the shell is provided with a second motor for driving the camera component to rotate vertically, and the second motor is electrically connected with the control circuit board.

Furthermore, the monitoring device further includes a wireless module provided in the shell or the base for communication, and the wireless module is electrically connected with the control circuit board and the MCU controller respectively.

Furthermore, the body further includes a rotating shaft arranged on the base. The rotating shaft is connected with the shell through a manual adjusting mechanism, and an end of the rotating shaft is connected with the rotating shaft of the first motor.

Furthermore, the lighting component includes a lamp panel arranged in the shell and an LED lamp arranged on the lamp panel, the heat sink is arranged on a back of the lamp panel, the lamp panel and the diffusion light transmissive panel are both defined with a first reserved opening, the camera component is arranged in the first reserved opening, and the motion detection component is located at the shell.

Furthermore, the control circuit board is arranged in the shell, and the rotating shaft is defined with a routing hole for routing, and the routing hole is respectively communicated with the shell and the base.

Furthermore, the base includes a face shell, a bottom shell connected with the face shell to form a cavity, and a mounting substrate mechanically connected with the face shell and the bottom shell.

The first motor is installed in the cavity, a surface of the face shell is convexly formed with an embedded pipe communicated with the cavity, the embedded pipe is disposed in the rotating shaft, and a top of the bottom shell extends into the face shell.

Furthermore, the shell is further provided with a photosensitive sensor electrically connected with the control circuit board for detecting ambient light.

Furthermore, the shell is also provided with a loudspeaker electrically connected with the control circuit board for playing audio and a microphone for collecting sound.

Furthermore, the shell or the base is provided with a power interface which is connected with the control circuit board and used for accessing the power supply.

Furthermore, the power supply component includes a rechargeable battery provided in the cavity, and the rechargeable battery is electrically connected with the control circuit board and the MCU controller respectively.

Furthermore, a bottom of the shell is defined with a second reserved opening, a top end of the rotating shaft is disposed in the second reserved opening, and a side wall of the second reserved opening is provided with a plurality of clamping grooves arranged surroundingly, and the rotating shaft is provided with clamping blocks at positions corresponding to the clamping grooves, and the clamping grooves are disposed in the clamping blocks. The manual adjusting mechanism includes a screw and a locking member, and the screw is inserted into the body and the rotating shaft and then connected with the locking member.

Furthermore, the camera component includes a middle shell embedded in the shell and a camera module provided in the middle shell. The second motor is arranged in the middle shell, and the rotating shaft of the second motor is connected with the shell; alternatively, the second motor is arranged in the shell, and the rotating shaft of the second motor is connected with the middle shell.

The disclosure has advantages that compared with the prior art, the vertical angle of the camera component can be adjusted by the manual adjustment mechanism, and then can be adjusted according to an installation height and a monitored range to meet users' needs. Furthermore, with the motion detection component provided, a signal can be fed back to the control circuit board only when the motion detection component detects the motion, and the control circuit board is awakened based on the signal and drives the camera component to make the camera shooting, and the first motor can be driven to drive the camera component to rotate horizontally to a direction where the motion occurs, so that monitoring for an accurate azimuth can be realized. In this way, the second power is greater than the first power, thereby saving power and resources.

DETAILED DESCRIPTION

The disclosure will be further explained with reference to the drawings and embodiments.

Referring to FIGS. 1 to 8, which show a monitoring device in an embodiment of this disclosure.

The monitoring device comprises a body 100, a control circuit board 800, a camera component 200, a motion detection component 300 and a power supply component which are arranged at the body 100. The control circuit board 800 is electrically connected with the camera component 200, the motion detection component 300 and the power supply component respectively, and the motion detection component 300 is electrically connected with the power component. The control circuit board 800 is awaken based on a detection result of the motion detection component 300, the control circuit board 800 drives the camera component 200 to make a camera shooting after being awaken, and power supplied by the power supply component to the awakened control circuit board 800 and the camera component 200 is a second power. Power supplied by the power supply component 300 to the motion detection component before the control circuit board 800 is awakened is a first power, and the second power is greater than the first power. The body 100 is provided with a manual adjusting mechanism 400 for adjusting a vertical angle of the camera component 200, and the body 100 is provided with a first motor 500 for adjusting a horizontal angle of the camera component 200, which is electrically connected with the control circuit board 800.

When the monitoring device is installed at a high place, the vertical angle of the camera component 200 can be adjusted by the manual adjustment mechanism 400 according to an installation height and a monitored range to meet users' needs. Furthermore, with the motion detection component 300 provided, a signal can be fed back to the control circuit board 800 only when the motion detection component 300 detects the motion, and the control circuit board 800 is awakened based on the signal and drives the camera component 200 to make the camera shooting, and the first motor 500 can be driven to drive the camera component 200 to rotate horizontally to a direction where the motion occurs, so that monitoring for an accurate azimuth can be realized. When the motion detection component 300 does not detect any motion, a low power consumption mode is realized, and the second power is greater than the first power, thereby saving power and resources.

In an embodiment, in order to realize lighting, the monitoring device further includes a lighting component 900 provided on the body 100, and the lighting component 900 is electrically connected with the control circuit board 800. Furthermore, with the lighting component 900, when the motion detection component 300 detects motions, images collected by the camera component 200 can be analyzed by the control circuit board 800 to determine whether there is an intruder, and if there is an intruder, the lighting component lights up to deter the intruder, causing the intruder to give up an intrusion behavior, especially at night, and false alarm of the intruder which causes a problem that the lighting component 900 often turns on and off to disturb people can be prevented.

In an embodiment, in order to uniformly diffuse light, the lighting component 900 is arranged in the body 100, and the body 100 is provided with a diffusion light transmissive plate 111 at a position corresponding to the lighting component 900.

In an embodiment, in order to facilitate heat dissipation of the lighting component 900 and prolong service life of the lighting component 900, the monitoring device further includes a heat sink 940 arranged at the body 100, and the heat sink 940 is arranged at a back of the lighting component 900.

Figure 5:
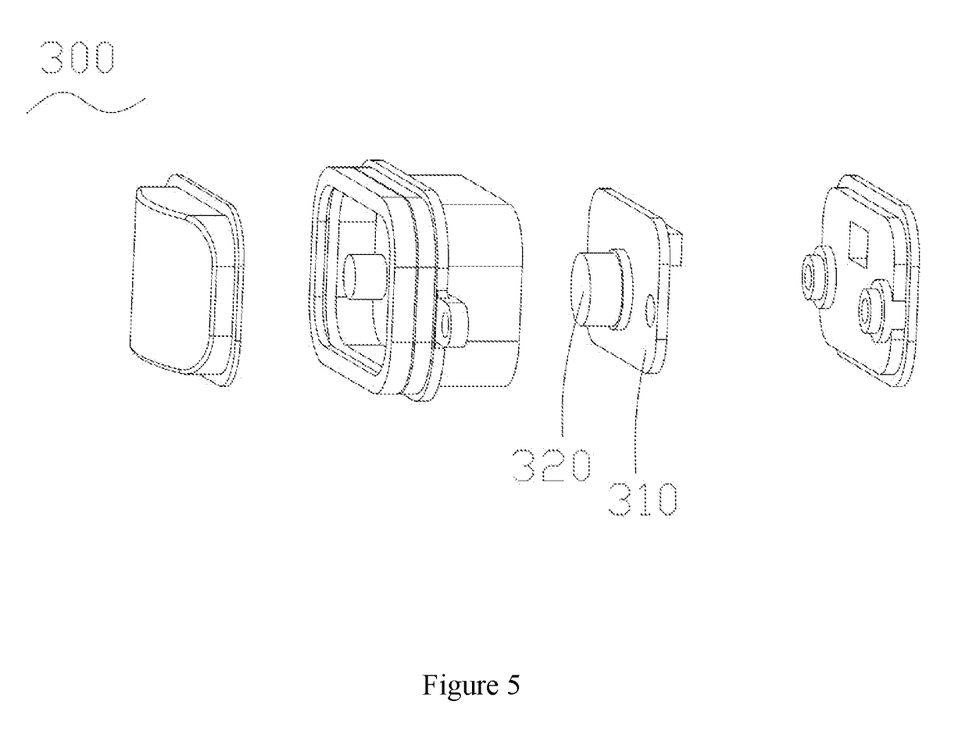
FIG. 5 is an exploded view of a motion detection component according to the disclosure.

In an embodiment, the motion detection component 300 includes an MCU controller 310 and a motion detection sensor 320 which are arranged at the body 100, and the MCU controller 310 is electrically connected with the motion detection sensor 320, the control circuit board 800 and the power supply component respectively. Specifically, the motion detection sensor 320 can be one or more of an infrared sensor, a radar sensor and an ultrasonic sensor. When the motion detection sensor 320 detects motions, it feeds back a signal to the control circuit board 800 through the MCU controller 310.

In an embodiment, the body 100 includes a shell 110 and a base 130, the camera component 200 is arranged in the shell 110, the first motor 500 is arranged on the base 130, and the rotating shaft of the first motor 500 is connected with the shell 110 and used for driving the shell 110 to rotate horizontally. In addition, the first motor 500 can also be arranged on the shell 110, and the rotating shaft of the first motor 500 is connected with the base 130 for driving the shell 110 to rotate horizontally, which is not limited herein.

In an embodiment, in order to improve the vertical rotation angle of the camera component 200, the shell 110 is provided with a second motor 220 for driving the camera component 200 to rotate vertically, and the second motor 220 is electrically connected with the control circuit board 800.

In an embodiment, the monitoring device further includes a wireless module provided in the shell 110 or the base 130 for communication, and the wireless module is electrically connected with the control circuit board 800 and the MCU controller 310 respectively. With the wireless module, the disclosure can be used in combination with software so that monitoring of the camera component 200 and lighting of the lighting component 900 in the disclosure can be controlled through mobile phones, etc., and the user can be informed when the motion detection component 300 detects the motion, which is convenient for the user to use. Specifically, the wireless module can be directly arranged on the control circuit board 800, or it can be an independent circuit board, which is not limited herein. The wireless module can be one of a WIFI module, a 3G module, a 4G module and a 5G module, and more advanced technologies, such as a 6G module currently under development, which is not limited herein.

In an embodiment, the body 100 further includes a rotating shaft 120 provided on the base 130, the rotating shaft 120 and the shell 110 vertically rotate through the manual adjusting mechanism 400, and the rotating shaft of the first motor 500 is connected with an end of the rotating shaft 120 through a gear 510. In this way, the first motor 500 drives the shell 110 to rotate horizontally by driving the rotating shaft 120, that is, to drive the camera component 200 to rotate horizontally. An angle between the shell 110 and the rotating shaft 120 can be adjusted by vertically rotating the rotating shaft 120 and the shell 110 through the manual adjusting mechanism 400, that is, the vertical angle of the camera component 200 can be adjusted.

In an embodiment, the lighting component 900 includes a lamp panel 930 arranged in the shell 110 and an LED lamp 910 arranged on the lamp panel 930. The heat sink 940 is arranged on a back of the lamp panel 930. The lamp panel 930 and the diffusion light transmissive plate 111 are both defined with a first reserved opening 920. The camera component 200 is arranged in the first reserved opening 920, and the motion detection component 300 is located below the camera component 200, thereby reducing a volume of the shell 110.

Specifically, the heat sink 940 can be a silicon material or a fin attached to the back of the lamp panel 930, and in order to increase heat dissipation effect, the shell 110 can also be made of a metal material. In an embodiment, the lamp panel 930 can also have its own heat dissipation interface, for example, the lamp panel 930 is with an aluminum substrate.

In an embodiment, in order to facilitate electrical connection between the control circuit board 800 and the first motor 500, the control circuit board 800 is arranged inside the shell 110 and behind the camera component 200, and the rotating shaft 120 is defined with a routing hole 122 for routing, and the routing hole is respectively connected with the shell 110 and the base 130.

In an embodiment, the shell 110 or the base 130 is provided with a power interface 138 connected with the control circuit board 800, and the power supply component includes a rechargeable battery 600 provided on the base 130, and the rechargeable battery 600 is electrically connected with the control circuit board 800 and the MCU controller 310 respectively. The rechargeable battery 600 can be supplied with power through the control circuit board 800 by using the power interface 138 to access a power supply. Here, it should be noted that the monitoring device can also be directly powered by utility power through an adapter, which is not limited herein.

Figure 7:
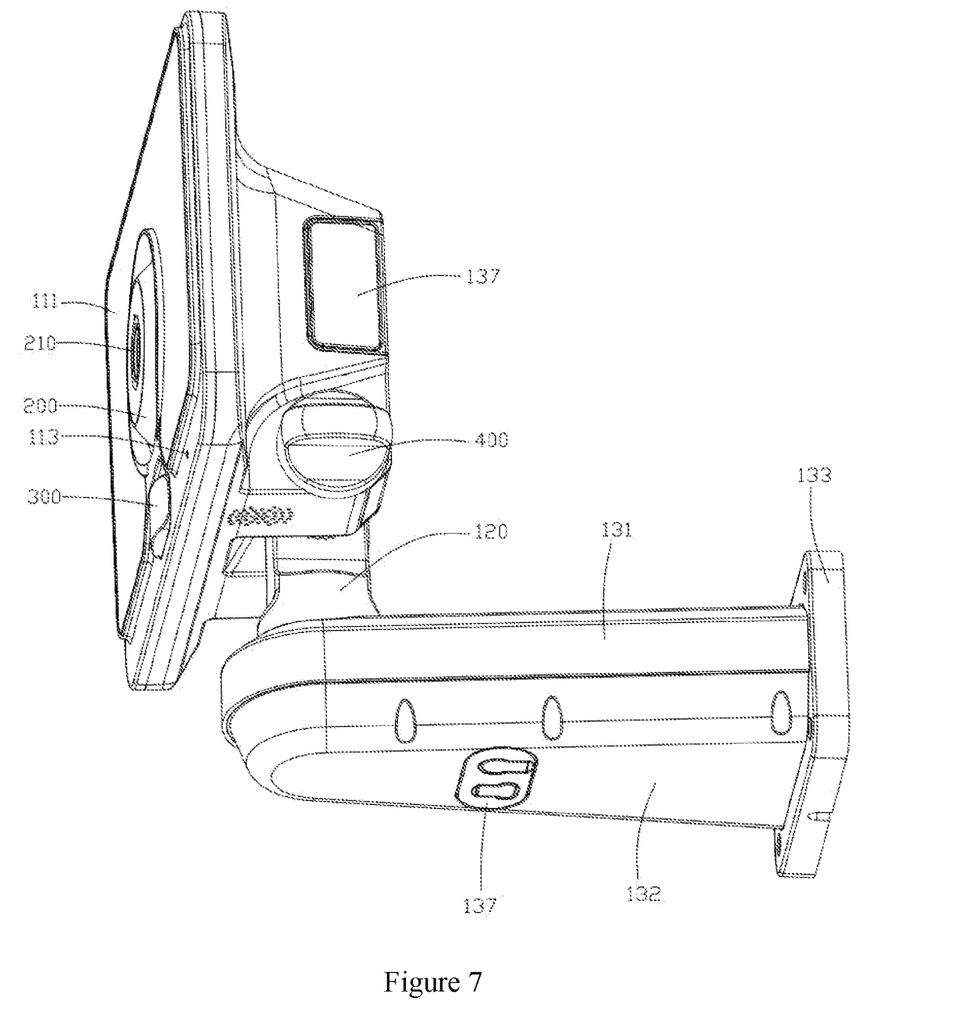
FIG. 7 is another perspective view of a monitoring device according to the disclosure.

In an embodiment, specifically, the base 130 includes a face shell 131, a bottom shell 132 connected with the face shell 131 to form a cavity 136, and a mounting substrate 133 mechanically connected with the face shell 131 and the bottom shell 132, the whole monitoring device can be fixed to a mounting surface such as a wall through the mounting substrate. The rechargeable battery 600 and the first motor 500 are both installed in the cavity 136. A surface of the face shell 131 is convexly formed with an embedded pipe 135 which is communicated with the cavity 136. The embedded pipe 135 is disposed in the rotating shaft 120, and a top of the bottom shell 132 extends into the face shell 131, so that when it rains, rainwater can flow down along the embedded pipe 135 and the bottom shell 132, and will not enter the cavity 136, thus playing a preliminary waterproof role. In an embodiment, after the face shell 131 is mechanically connected with the bottom shell 132, a bottom surface of the face shell 131 protrudes from a top surface of the bottom shell 132, that is, in a form of a step, as shown in FIG. 7, to further play a waterproof role. Furthermore, the rechargeable battery 600 and the first motor 500 are arranged in the cavity 136, which can prevent the rechargeable battery 600 and the first motor 500 from being arranged in the shell 110 and cooperating with weight of the rotating shaft 120 directly pressing at an end of the base 130, thus reducing a bearing force of the base 130 and improve installation reliability.

In an embodiment, in order to reduce deviation of a shooting angle in an up-down direction when the camera component 200 rotates, a angle between a central axis of the first motor 500 in rotating and a fixed surface of the mounting substrate 133 in mounting is less than 45 degrees. Optimally, the central axis of the first motor 500 in rotating is parallel to a wall surface of the mounting substrate 133 in mounting, that is, the rotating shaft 120 is parallel to the wall surface, so as to ensure that the shooting angle of the camera component 200 does not shift when the camera component is rotated.

In an embodiment, the shell 110 is further provided with a photosensitive sensor 230 electrically connected with the control circuit board 800 for detecting ambient light. When the light is dim, the photosensitive sensor 230 transmits a signal to the control circuit board 800, thereby realizing a mode that the lighting component 900 does not operate during the day and only operates at night, and automatically lights up at night to realize a lighting function according to the user's needs.

In an embodiment, the shell 110 is also provided with a loudspeaker 118 electrically connected with the control circuit board 800 for playing audio and a microphone 117 for collecting sound. The microphone 117 collects the sound and the speaker 118 plays the audio. Furthermore, user's voice can be sent by the mobile phone, received by the wireless module, and transmitted to the speaker 118 through the control circuit board 800 to play, so as to realize conversation between the user and a person near the monitoring device.

In an embodiment, the shell 110 or the base 130 is provided with a USB interface 820 and a storage module 810, and the USB interface 820 can be used for data transmission. The storage module 810 can be a TF card slot 121 or a SD card slot 121, etc. The TF card slot 121 can be used with a TF memory card to store information collected by the camera component 200.

In an embodiment, the camera component 200 includes an infrared camera module 210 to realize night monitoring and improve functionality of the disclosure. The infrared camera module 210 can be of a single lens or multiple lenses, which is not limited herein.

Figure 1:
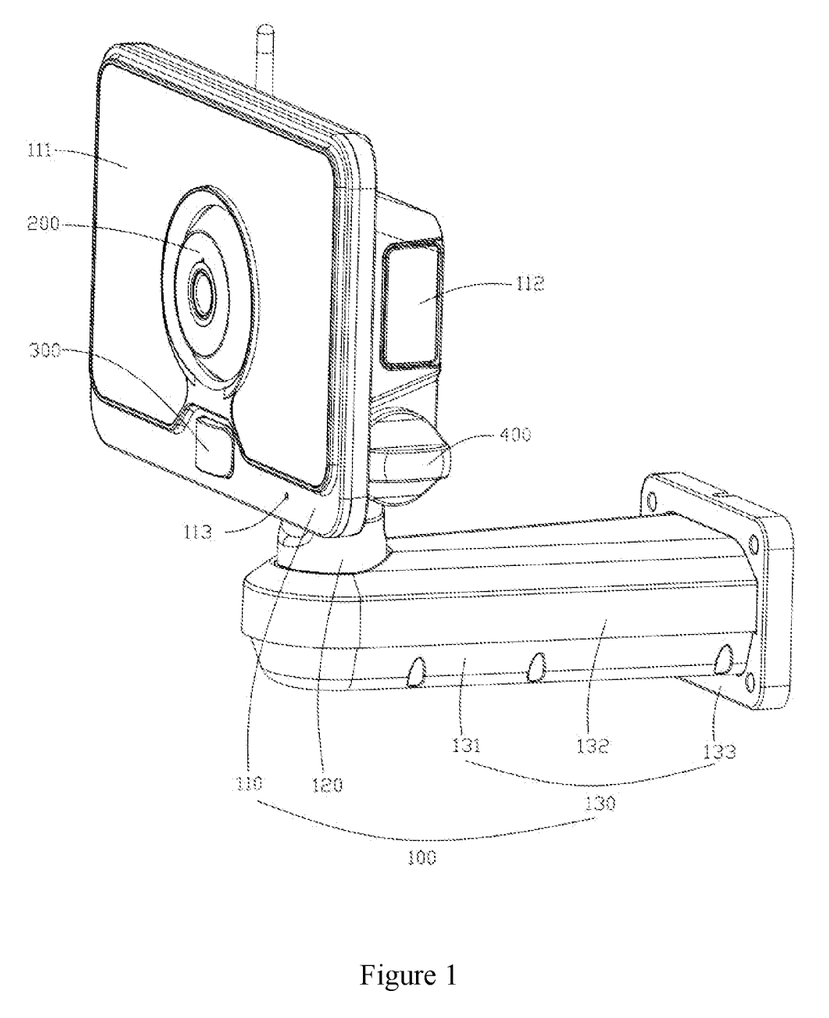
FIG. 1 is a perspective view of a monitoring device according to the disclosure.
Figure 2:
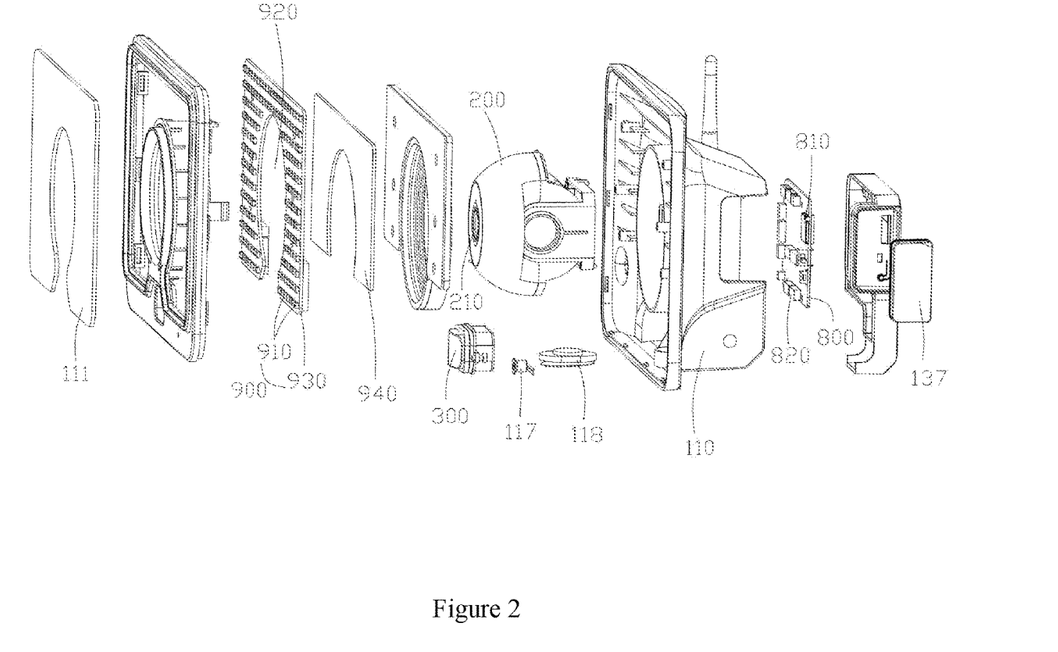
FIG. 2 is a partial explosion view of a monitoring device according to the disclosure.
Figure 3:
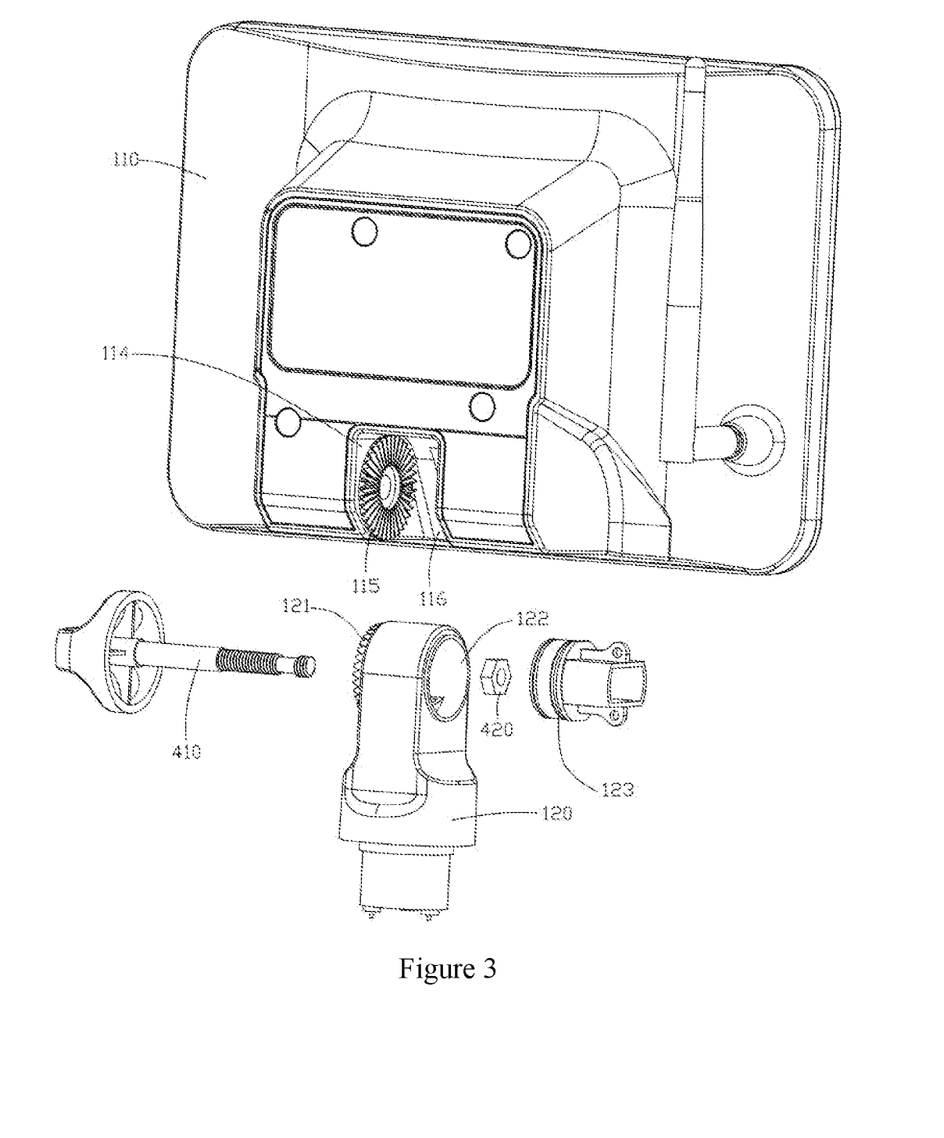
FIG. 3 is an exploded view of a shell, a rotating shaft and a manual adjustment mechanism according to the disclosure.
Figure 4:
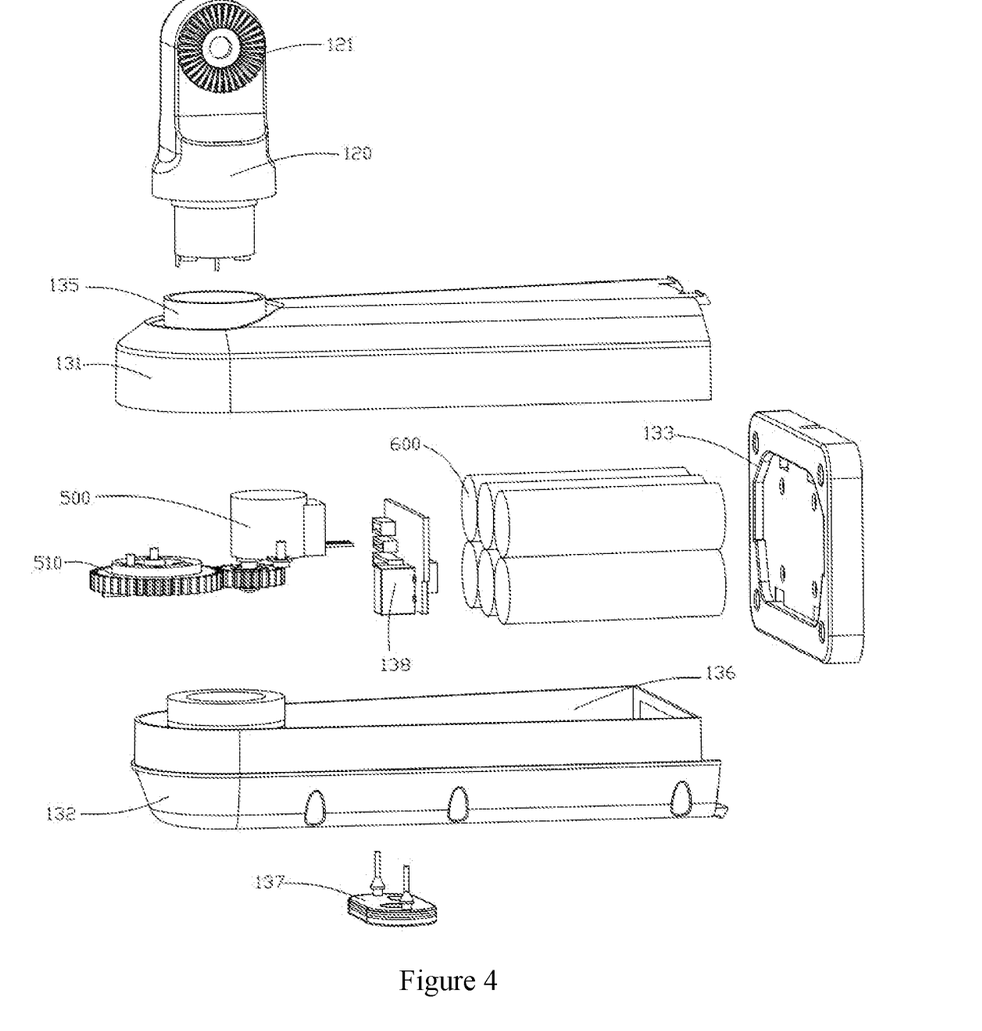
FIG. 4 is an exploded view of another part of the monitoring device according to the disclosure.

Specifically, in this embodiment, as shown in FIG. 3, a bottom of the shell 110 is provided with a second reserved opening 114, a top end of the rotating shaft 120 is disposed in the second reserved opening 114, and a side wall of the second reserved opening 114 is provided with a plurality of clamping grooves 115 arranged surroundingly, and the rotating shaft 120 is provided with clamping blocks 121 at positions corresponding to the clamping grooves 115, and the clamping grooves 115 are disposed in the clamping blocks 121. And a side wall of the second reserved opening 114 may be a inclined face. With the inclined face, an included angle between the shell 110 and the rotating shaft 120 can be greater than 90 degrees. The manual adjusting mechanism 400 includes a screw 410 and a locking member 420, and the screw 410 is inserted into the body 100 and the rotating shaft 120 and then connected with the locking member 420. In this way, when the screw 410 is rotated, the rotating shaft 120 can be loosened by matching with the locking member 420, so as to adjust positions of the clamping groove 115 and the clamping block 121, so as to adjust the angle between the rotating shaft 120 and the shell 110.

Figure 6:
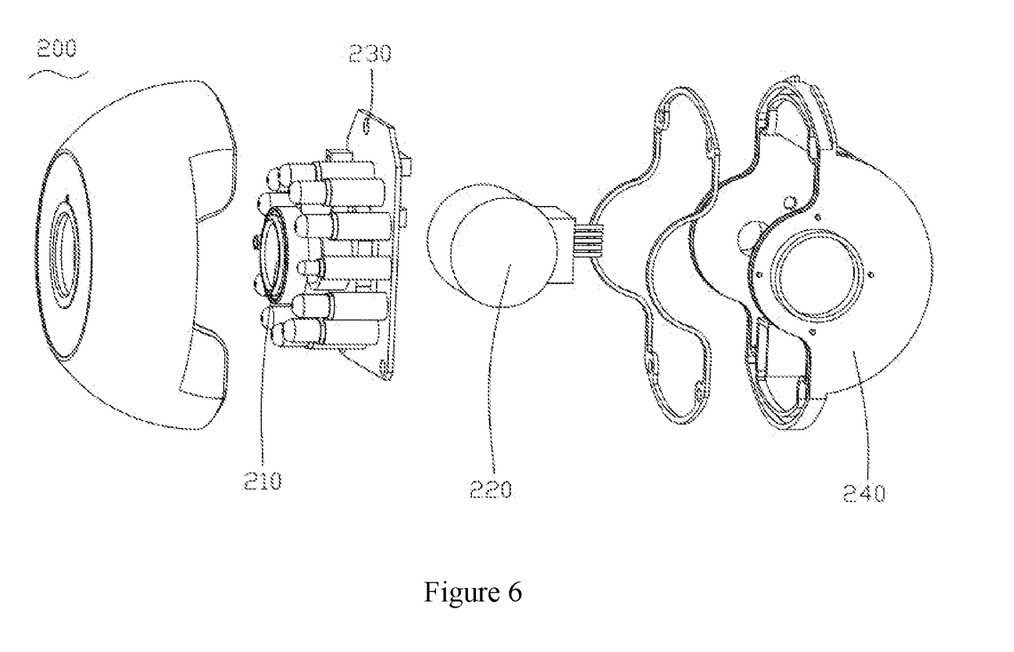
FIG. 6 is an exploded view of a camera component of the disclosure.

The camera component 200 includes an middle shell 240 embedded in the shell 110, and a camera module 210 provided in the middle shell 240. The second motor 220 is arranged in the middle shell 240, and the rotating shaft of the second motor 220 is connected with the shell 110.

Figure 8:
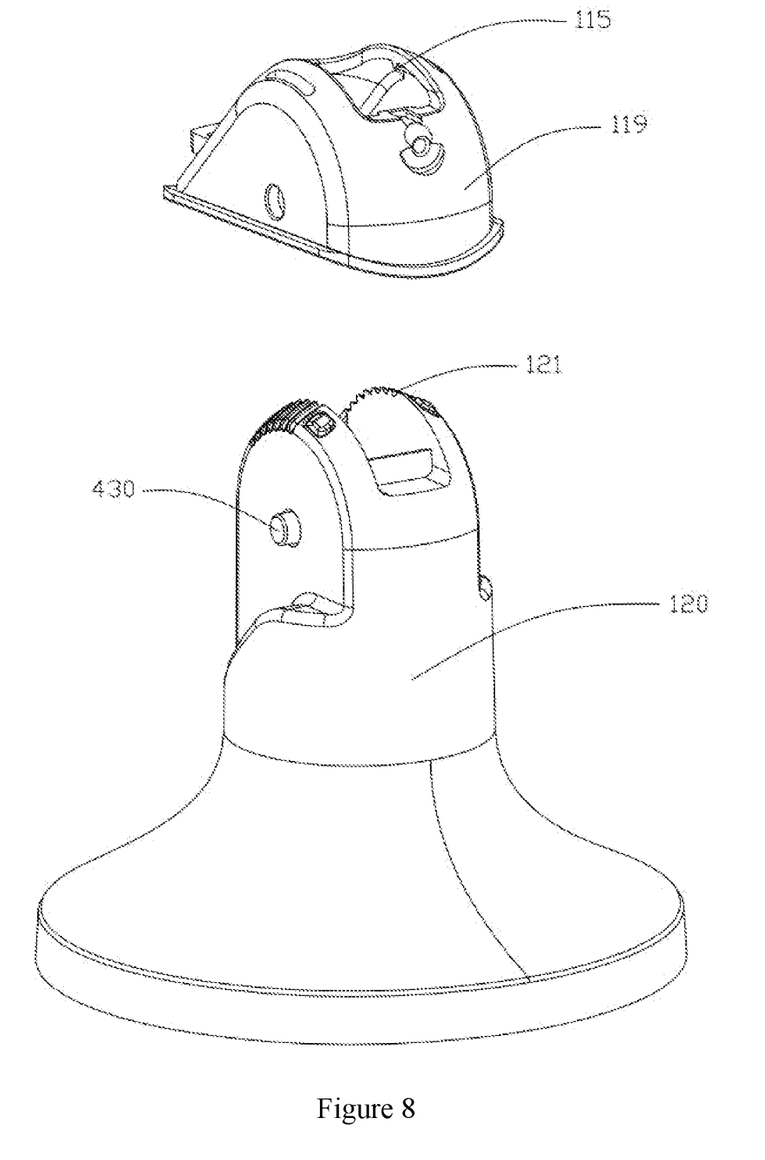
FIG. 8 is an exploded view of another manual adjusting mechanism and the rotating shaft according to the disclosure.

Here, it should be noted that the manual adjustment mechanism 400 can also be composed of a shaft 430 and a rubber member 119 matched with a top of the rotating shaft 120. The rubber member 119 is fixed in the second reserved opening 114, and the clamping blocks 121 are located on the rubber member 119. With a damping force of the rubber member 119, the clamping grooves 115 and the clamping blocks 121 can be cooperated to adjust a positional relationship between the clamping blocks 121 and the clamping grooves 115, as shown in FIG. 8.

In the monitoring device of the disclosure, a universal ball joint structure between the rotating shaft 120 and the shell 110, instead of the clamping blocks 121 in cooperation with the clamping grooves 115, can be used and then a locking component or a locking nut can be combined to lock to adjust the angle; alternatively, a rubber ring is used between the rotating shaft 120 and the shell 110 to prevent sliding, or two contact damping surfaces are used to achieve damping effect, and then a locking component is combined to lock to realize angle adjustment, etc. In addition, the manual adjusting mechanism 400 can also be a set screw or a bead screw cooperating with a threaded hole to lock the shell 110 and the rotating shaft 120; or can be a known existing locking component, such as a pin shaft cooperating a pin, to lock the shell 110 and the rotating shaft 120, which is not limited herein.

In an embodiment, in order to play a waterproof role, the shell 110 or the base 130 is provided with silica plugs 137 at positions corresponding to the USB interface 820, the TF card slot 121 and the power interface 138. Rubber rings 123 are provided between the shell 110 and the camera component 200, the motion detection component 300, the rotating shaft 120, the face shell 131 and the rotating shaft 120, and between the bottom shell 132 and the face shell 131, to realize waterproof. It should be noted herein that in order to achieve waterproof effect, it can also be achieved by gluing, etc., which is not limited herein.

The above is only implementations of this disclosure, and it should be noted herein that for ordinary technicians in the art, improvements can be made without departing from the inventive concept of this disclosure, but all of these are within a scope of protection of this disclosure.

The invention claimed is:

1. A monitoring device, comprising a body; and a control circuit board, a camera component, a motion detection component and a power supply component which are provided at the body, wherein the control circuit board is electrically connected with the camera component, the motion detection component and the power supply component respectively, and the motion detection component is electrically connected with the power component;

the control circuit board is awaken based on a detection result of the motion detection component, the control circuit board drives the camera component to make a camera shooting after being awaken; and power supplied by the power supply component to the awakened control circuit board and the camera component is a second power, and power supplied by the power supply component to the motion detection component before the control circuit board is awakened is a first power, and the second power is greater than the first power;

the body is provided with a manual adjusting mechanism for adjusting a vertical angle of the camera component; and the body is provided with a first motor for adjusting a horizontal angle of the camera component, which is electrically connected with the control circuit board.

2. The monitoring device according to claim 1, wherein the monitoring device further comprises a lighting component provided at the body, the lighting component being electrically connected with the control circuit board.

3. The monitoring device according to claim 2, wherein the lighting component is arranged inside the body, and the body is provided with a diffusion light transmissive plate at a position corresponding to the lighting component.

4. The monitoring device according to claim 3, wherein the monitoring device further comprises a heat sink provided at the body, the heat sink being arranged on a back of the lighting component.

5. The monitoring device according to claim 4, wherein the motion detection component comprises an MCU controller and a motion detection sensor which are arranged at the body, the MCU controller being electrically connected with the motion detection sensor, the control circuit board and the power supply component respectively.

6. The monitoring device according to claim 5, wherein the body comprises a shell and a base, and the camera component is arranged in the shell; and the first motor is arranged on the base, and a rotating shaft of the first motor is connected with the shell and used for driving the shell to rotate horizontally; or, the first motor is arranged on the shell, and the rotating shaft of the first motor is connected with the base for driving the shell to rotate horizontally.

7. The monitoring device according to claim 6, wherein the shell is provided with a second motor for driving the camera component to rotate vertically, and the second motor is electrically connected with the control circuit board.

8. The monitoring device according to claim 7, wherein the monitoring device further comprises a wireless module provided in the shell or the base for communication, the wireless module being electrically connected with the control circuit board and the MCU controller respectively.

9. The monitoring device according to claim 8, wherein the body further comprises a rotating shaft arranged on the base, the rotating shaft being connected with the shell through a manual adjusting mechanism, and an end of the rotating shaft being connected with the rotating shaft of the first motor.

10. The monitoring device according to claim 9, wherein the lighting component comprises a lamp panel arranged in the shell and an LED lamp arranged on the lamp panel, the heat sink is arranged on a back of the lamp panel, the lamp panel and the diffusion light transmissive panel are both defined with a first reserved opening, the camera component is arranged in the first reserved opening, and the motion detection component is located at the shell.

11. The monitoring device according to claim 10, wherein the control circuit board is arranged in the shell, and the rotating shaft is defined with a routing hole for routing, and the routing hole is respectively communicated with the shell and the base.

12. The monitoring device according to claim 11, wherein the base comprises a face shell, a bottom shell connected with the face shell to form a cavity, and a mounting substrate mechanically connected with the face shell and the bottom shell; and
the first motor is installed in the cavity, a surface of the face shell is convexly formed with an embedded pipe communicated with the cavity, the embedded pipe is disposed in the rotating shaft, and a top of the bottom shell extends into the face shell.

13. The monitoring device according to claim 12, wherein the shell is further provided with a photosensitive sensor electrically connected with the control circuit board for detecting ambient light.

14. The monitoring device according to claim 13, wherein the shell is further provided with a loudspeaker electrically connected with the control circuit board for playing audio and a microphone for collecting sound.

15. The monitoring device according to claim 14, wherein the shell or the base is provided with a power interface which is connected with the control circuit board and used for accessing the power supply.

16. The monitoring device according to claim 15, wherein the power supply component comprises a rechargeable battery provided in the cavity, the rechargeable battery being electrically connected with the control circuit board and the MCU controller respectively.

17. The monitoring device according to claim 16, wherein a bottom of the shell is defined with a second reserved opening, a top end of the rotating shaft is disposed in the second reserved opening, and the second reserved opening is provided with a plurality of clamping grooves, and the rotating shaft is provided with clamping blocks at positions corresponding to the clamping grooves, and the clamping grooves are disposed in the clamping blocks; and the manual adjusting mechanism comprises a screw and a locking member, the screw being inserted into the body and the rotating shaft and then connected with the locking member.

18. The monitoring device according to claim 16, wherein the camera component comprises a middle shell embedded in the shell and a camera module provided in the middle shell; and
the second motor is arranged in the middle shell, and the rotating shaft of the second motor is connected with the shell; or, the second motor is arranged in the shell, and the rotating shaft of the second motor is connected with the middle shell.

* * * * *